US007214133B2

(12) United States Patent
Jen et al.

(10) Patent No.: US 7,214,133 B2
(45) Date of Patent: May 8, 2007

(54) METHOD AND APPARATUS FOR RETRIEVING RECORDED RACES FOR USE IN A GAME

(75) Inventors: James Jen, Redmond, WA (US); Chris Novak, Issaquah, WA (US); Martyn Chudley, Knutsford (GB); David Worswick, Standish Wigan (GB)

(73) Assignee: Microsoft Corporation, Redmond, WA (US)

( * ) Notice: Subject to any disclaimer, the term of this patent is extended or adjusted under 35 U.S.C. 154(b) by 542 days.

(21) Appl. No.: 10/435,527

(22) Filed: May 9, 2003

(65) Prior Publication Data
US 2004/0224741 A1 Nov. 11, 2004

(51) Int. Cl.
G06F 17/00 (2006.01)
G06F 19/00 (2006.01)

(52) U.S. Cl. .................. 463/42; 463/40; 463/41; 463/43; 434/69

(58) Field of Classification Search ............ 463/40–43; 434/69
See application file for complete search history.

(56) References Cited

U.S. PATENT DOCUMENTS

| 5,269,687 | A | | 12/1993 | Mott et al. | |
|---|---|---|---|---|---|
| 5,354,202 | A | | 10/1994 | Moncrief et al. | |
| 5,577,913 | A | | 11/1996 | Moncrief et al. | |
| 5,791,992 | A | | 8/1998 | Crump et al. | |
| 6,010,403 | A | * | 1/2000 | Adam et al. ............... | 463/6 |
| 6,149,519 | A | | 11/2000 | Osaki et al. | |
| 6,386,979 | B1 | | 5/2002 | Ho et al. | |
| 6,468,160 | B2 | | 10/2002 | Eliott | |
| 6,488,505 | B1 | * | 12/2002 | Hightower ............... | 434/69 |
| 6,699,127 | B1 | * | 3/2004 | Lobb et al. ............... | 463/43 |
| 6,712,704 | B2 | | 3/2004 | Eliott | |
| 6,755,654 | B2 | * | 6/2004 | Hightower ............... | 434/69 |
| 6,769,989 | B2 | | 8/2004 | Smith et al. | |
| 2002/0068629 | A1 | | 6/2002 | Allen et al. | |
| 2002/0142845 | A1 | | 10/2002 | Whitten et al. | |
| 2003/0054869 | A1 | | 3/2003 | Hightower | |
| 2004/0097287 | A1 | * | 5/2004 | Postrel ................... | 463/41 |
| 2004/0162137 | A1 | | 8/2004 | Eliott | |
| 2005/0277287 | A1 | * | 12/2005 | Gillan et al. ............. | 463/42 |

FOREIGN PATENT DOCUMENTS

WO WO9719537 5/1997
WO WO 01/05475 A1 1/2001

OTHER PUBLICATIONS

Gran Turismo 3 A-spec: Instruction Manual. GT3 Released on Jul. 10, 2001, Scanned Copy. [online][retrieved on Apr. 7, 2006] Retrieved from: The Game Manual Archive <URL: http://www.gamemanuals.net/>, Attaching PDF Print Out (27 pages).*
Matko, et al; "Virtual Race as an Examination Test: Models, Solutions, Experiences"; IEEE Transactions on Education, vol. 44, No. 4, Nov. 2001; 0018-9359/01; pp. 342-347.
Mooney, et al; "CyberIST: a virtual game for medical education"; 1998 Carfax Publishing Ltd.; 0142-159X/98/030212-05; pp. 212-216.
"The DexDrive" Online!; Nov. 18, 1998; www.ign.com; 5 pages.

* cited by examiner

Primary Examiner—Scott Jones
Assistant Examiner—Milap Shah

(57) ABSTRACT

A recorded race is downloaded from an online gaming service. The recorded race is associated with a game program. The game program is launched on a game console. The recorded race is applied to the game program executing on the game console such that the recorded race controls a first vehicle moving through a course. Control inputs are received from an input device coupled to the game console. The control inputs control a second vehicle moving through the course.

25 Claims, 7 Drawing Sheets

300

| 302 | 304 | 306 | 308 | 310 |
|---|---|---|---|---|
| RANK | PLAYER NAME | LAP | ATTACHMENT | AVAILABLE? |
| 1 | JOHN DOE | 1.02.50 | RECORDED RACE | YES |
| 2 | MASTER GAMER | 1.03.09 | SPECIAL MOVES | YES |
| 3 | BOB SMITH | 1.03.11 | | |
| 4 | JANE DOE | 1.03.12 | RECORDED RACE | YES |
| 5 | GAME STAR | 1.03.22 | RECORDED RACE | NO |
| 6 | KAREN SMITH | 1.03.40 | RECORDED RACE | YES |
| 7 | JOE PILOT | 1.03.55 | | |
| 8 | FIGHTER BOB | 1.03.72 | SPECIAL MOVES | NO |
| 9 | MARY JONES | 1.03.81 | RECORDED RACE | YES |
| 10 | DAVE RIDER | 1.03.86 | RECORDED RACE | YES |

GAME SETTINGS
DIFFICULTY: EXPERT
VEHICLE SETTINGS: GT-50, RED
VEHICLE SUSPENSION: NORMAL
COURSE: LAS VEGAS
ROUTE: CITY STREETS

404 / 406

| TIME | CONTROLLER INPUT |
|---|---|
| 0.00.00 | NONE |
| 0.00.90 | RIGHT TRIGGER |
| 0.01.34 | LEFT THUMBSTICK, PRESSED RIGHT |
| 0.01.78 | RIGHT TRIGGER |
| 0.02.23 | RIGHT TRIGGER + B BUTTON |
| 0.02.61 | NONE |
| 0.02.98 | LEFT TRIGGER |
| 0.03.15 | RED BUTTON |
| ⋮ | ⋮ |
| 1.03.26 | LEFT TRIGGER |

*Fig. 4*

METHOD AND APPARATUS FOR RETRIEVING RECORDED RACES FOR USE IN A GAME

TECHNICAL FIELD

The systems and methods described herein relate to gaming systems and, more particularly, to saving and retrieving recorded game data.

BACKGROUND

Traditionally, gaming systems accommodated a limited number of players, such as 1–4 players. A recent trend in gaming systems is to provide capabilities to facilitate gaming among multiple players over a network, such as Internet-based online gaming. These online gaming systems allow players to compete with other players, regardless of their geographic location.

An important challenge faced by game developers and game publishers is creating games that are enjoyable and challenging to play for a significant period of time. The best selling games are often those that provide incentives for players to keep playing the game for several months at a time. Online features can provide incentives for players to continue playing a particular game. For example, online statistics, such as top scores for a particular game, allow players to compete for "bragging rights" amongst the world's top players or amongst their friends.

Accordingly, it is desirable to provide additional online features that encourage gamers to continue playing a particular game.

SUMMARY

The systems and methods described herein allow the retrieval data, such as recorded game data or game highlights, from a players' ratings or other location in an online gaming system. Other players can download this data to learn how the top players achieved their ratings. Additionally, players can download, for example, recorded game data generated by other players and compete against the recorded game data to improve their skills. Alternatively, players may view recorded games to see how other players, such as the top-rated players, play the game.

In a particular embodiment, a recorded race is downloaded from an online gaming service. The recorded race is associated with a game program. The game program is launched on a game console. The recorded race is applied to the game program executing on the game console such that the recorded race controls a first vehicle moving through a course. Control inputs are received from an input device coupled to the game console. The control inputs control a second vehicle moving through the course.

BRIEF DESCRIPTION OF THE DRAWINGS

Similar reference numbers are used throughout the figures to reference like components and/or features.

FIG. 3 illustrates an example of a leaderboard provided to a game console user.

FIG. 4 illustrates an example of recorded game data associated with a car racing game.

DETAILED DESCRIPTION

The following discussion is directed to a system and method for saving and retrieving recorded game data through an online gaming service. The discussion assumes that the reader is familiar with basic cryptography principles, such as encryption, decryption, authentication, hashing, and digital signatures. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Discussions herein refer to a "rating", a "leaderboard" and an "attachment". A rating is a score assigned to a player or a team as a result of some aspect of gameplay. A leaderboard is a ranked collection of ratings that resulted from some aspect of gameplay stored in a statistics service. An attachment is any data associated with a rating on a statistics leaderboard. For example, an attachment may be a recorded game, a saved action or movement in a game, an audio file containing the voice of a player explaining how a high score was achieved, etc.

As used herein, a "recorded game", "saved game", "recorded race", "saved race" or similar terminology may refer to an entire game (such as an entire auto race) or to a portion of an entire game (such as one lap in an auto race or a portion of a lap in an auto race). Further, the terms "race" and "game" may refer to practice sessions, training sessions, and other activities in which a player of the game is not competing against another player, another recorded game, a game-generated entity, or any other competitor.

Figure 1:
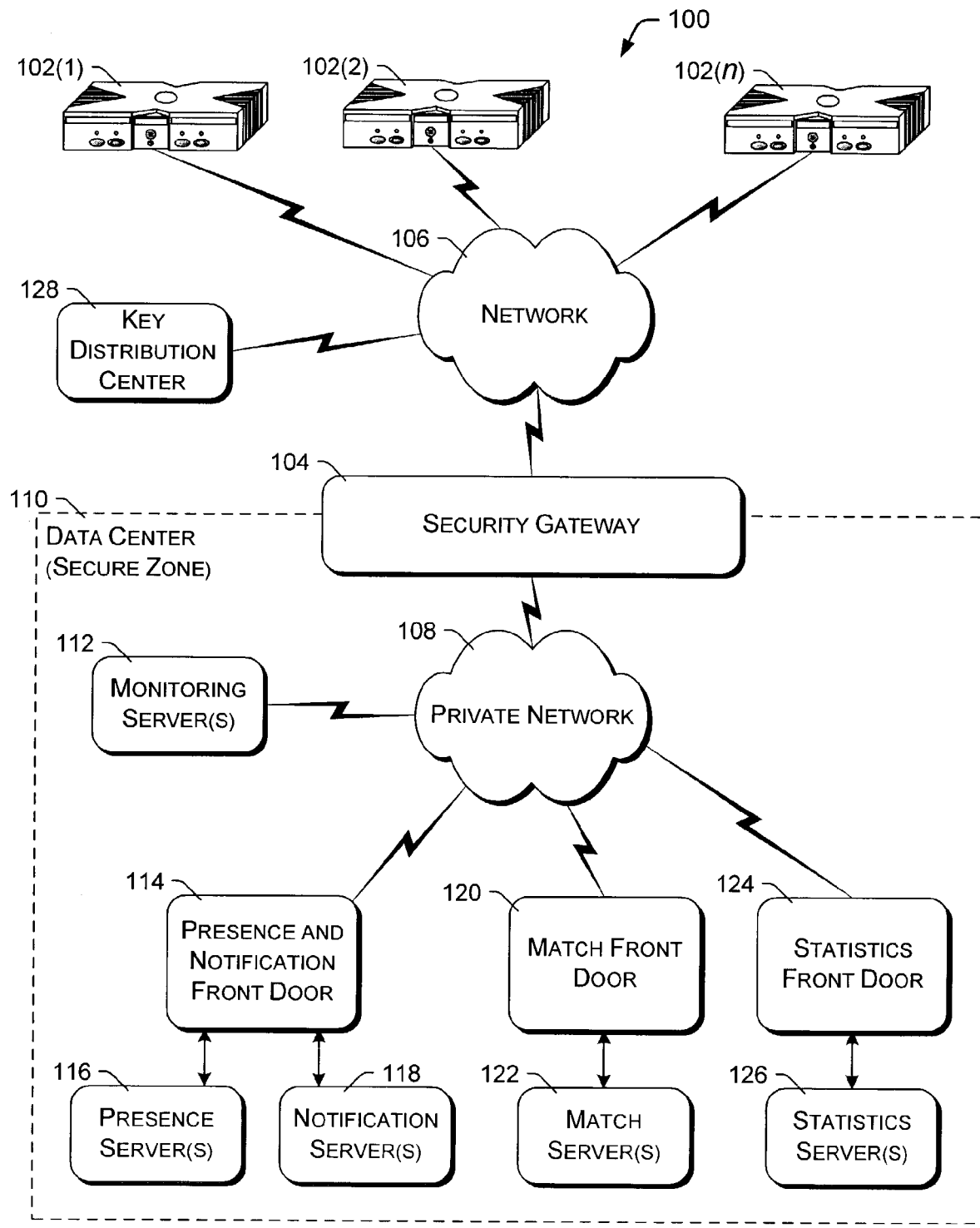
FIG. 1 is a block diagram of an exemplary online gaming environment.

FIG. 1 is a block diagram of an exemplary online gaming environment 100. Multiple game consoles 102(1), 102(2), . . . , 102(n) are coupled to a security gateway 104 via a network 106. Network 106 represents any one or more of a variety of conventional data communications networks. Network 106 will typically include packet switched networks, but may also include circuit switched networks. Network 106 can include wired and/or wireless portions. In one exemplary implementation, network 106 includes the Internet and may optionally include one or more local area networks (LANs) and/or wide area networks (WANs). At least a part of network 106 is a public network, which refers to a network that is publicly-accessible. Virtually anyone can access the public network.

In some situations, network 106 includes a LAN (e.g., a home network), with a routing device situated between game console 102 and security gateway 104. This routing device may perform network address translation (NAT), allowing the multiple devices on private network 108 (or a LAN) to share the same IP address on the Internet, and also operating as a firewall to protect the device(s) from access by malicious or mischievous users via the Internet.

Security gateway 104 operates as a gateway between public network 106 and private network 108. Private network 108 can be any of a wide variety of conventional networks, such as a local area network. Private network 108, as well as other devices discussed in more detail below, is within a data center 110 that operates as a secure zone. Data center 110 is made up of trusted devices communicating via trusted communications. Thus, encryption and authentication within secure zone 110 is not necessary. The private nature of network 108 refers to the restricted accessibility of network 108—access to network 108 is restricted to only certain individuals (e.g., restricted by the owner or operator of data center 110).

Security gateway 104 is a cluster of one or more security gateway computing devices. These security gateway computing devices collectively implement security gateway 104. Security gateway 104 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 110 are: one or more monitoring servers 112; one or more presence and notification front doors 114, one or more presence servers 116, and one or more notification servers 118 (collectively implementing a presence and notification service); one or more match front doors 120 and one or more match servers 122 (collectively implementing a match service); and one or more statistics front doors 124 and one or more statistics servers 126 (collectively implementing a statistics service). The servers 116, 118, 122, and 126 provide services to game consoles 102, and thus can be referred to as service devices. Other service devices may also be included in addition to, and/or in place of, one or more of the servers 116, 118, 122, and 126. Additionally, although only one data center is shown in FIG. 1, alternatively multiple data centers may exist with which game consoles 102 can communicate. These data centers may operate independently or alternatively may operate collectively (e.g., to make one large data center available to game consoles 102).

Game consoles 102 are situated remotely from data center 110, and access data center 110 via network 106. A game console 102 desiring to communicate with one or more devices in data center 110 establishes a secure communication channel between the console 102 and security gateway 104. Game console 102 and security gateway 104 encrypt and authenticate data packets being passed back and forth, thereby allowing the data packets to be securely transmitted between them without being understood by any other device that may capture or copy the data packets without breaking the encryption. Each data packet communicated from game console 102 to security gateway 104, or from security gateway 104 to game console 102 can have data embedded therein. This embedded data is referred to as the content or data content of the packet. Additional information may also be inherently included in the packet based on the packet type (e.g., a heartbeat packet or traversal packet, discussed in more detail below).

The secure communication channel between a console 102 and security gateway 104 is based on a security ticket. Console 102 authenticates itself and the current user(s) of console 102 to a key distribution center 128 and obtains, from key distribution center 128, a security ticket. Console 102 then uses this security ticket to establish the secure communication channel with security gateway 104. In establishing the secure communication channel with security gateway 104, the game console 102 and security gateway 104 authenticate themselves to one another and establish a session security key that is known only to that particular game console 102 and the security gateway 104. This session security key is used as a basis to encrypt data transferred between the game console 102 and the security gateway cluster 104, so no other devices (including other game consoles 102) can read the data. The session security key is also used as a basis to authenticate a data packet as being from the security gateway 104 or game console 102 that the data packet alleges to be from. Thus, using such session security keys as a basis, secure communication channels can be established between the security gateway 104 and the various game consoles 102.

Once the secure communication channel is established between a game console 102 and the security gateway 104, encrypted data packets can be securely transmitted between the two. When the game console 102 desires to send data to a particular service device in data center 110, the game console 102 encrypts the data and sends it to security gateway 104 requesting that it be forwarded to the particular service device(s) targeted by the data packet. Security gateway 104 receives the data packet and, after authenticating and decrypting the data packet, encapsulates the data content of the packet into another message to be sent to the appropriate service via private network 108. Security gateway 104 determines the appropriate service for the message based on the requested service(s) targeted by the data packet.

Similarly, when a service device in data center 110 desires to communicate data to a game console 102, the data center sends a message to security gateway 104, via private network 108, including the data content to be sent to the game console 102 as well as an indication of the particular game console 102 to which the data content is to be sent. Security gateway 104 embeds the data content into a data packet, and then encrypts the data packet so it can only be decrypted by the particular game console 102 and also authenticates the data packet as being from the security gateway 104.

Although discussed herein as primarily communicating encrypted data packets between security gateway 104 and a game console 102, alternatively some data packets may be partially encrypted (some portions of the data packets are encrypted while other portions are not encrypted). Which portions of the data packets are encrypted and which are not can vary based on the desires of the designers of data center 110 and/or game consoles 102. For example, the designers may choose to allow voice data to be communicated among consoles 102 so that users of the consoles 102 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, the data packet is still authenticated.

Each security gateway device in security gateway 104 is responsible for the secure communication channel with typically one or more game consoles 102, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 112 operate to inform devices in data center 110 of an unavailable game console 102 or an unavailable security gateway device of security gateway 104. Game consoles 102 can become unavailable for a variety of different reasons, such as a hardware or software failure, the console being powered-down without logging out of data center 110, the network connection cable to console 102 being disconnected from console 102, other network problems (e.g., the LAN that the console 102 is on malfunctioning), etc. Similarly, a security gateway device of security gateway 104 can become unavailable for a variety of different reasons, such as hardware or software failure, the device being powered-down, the network connection cable to the device being disconnected from the device, other network problems, etc.

Each of the security gateway devices in security gateway 104 is monitored by one or more monitoring servers 112, which detect when one of the security gateway devices becomes unavailable. In the event a security gateway device becomes unavailable, monitoring server 112 sends a message to each of the other devices in data center 110 (servers, front doors, etc.) that the security gateway device is no longer available. Each of the other devices can operate based on this information as it sees fit (e.g., it may assume that particular game consoles being managed by the security gateway device are no longer in communication with data center 110 and perform various clean-up operations accordingly). Alternatively, only certain devices may receive such a message from the monitoring server 112 (e.g., only those devices that are concerned with whether security gateway devices are available).

Security gateway 104 monitors the individual game consoles 102 and detects when one of the game consoles 102 becomes unavailable. When security gateway 104 detects that a game console is no longer available, security gateway 104 sends a message to monitoring server 112 identifying the unavailable game console. In response, monitoring server 112 sends a message to each of the other devices in data center 110 (or alternatively only selected devices) that the game console is no longer available. Each of the other devices can then operate based on this information as it sees fit.

Presence server(s) 116 holds and processes data concerning the status or presence of a given user logged in to data center 110 for online gaming. Notification server(s) 118 maintains multiple queues of outgoing messages destined for a player logged in to data center 110. Presence and notification front door 114 is one or more server devices that operate as an intermediary between security gateway 104 and servers 116 and 118. One or more load balancing devices (not shown) may be included in presence and notification front door 114 to balance the load among the multiple server devices operating as front door 114. Security gateway 104 communicates messages for servers 116 and 118 to the front door 114, and the front door 114 identifies which particular server 116 or particular server 118 the message is to be communicated to. By using front door 114, the actual implementation of servers 116 and 118, such as which servers are responsible for managing data regarding which users, is abstracted from security gateway 104. Security gateway 104 can simply forward messages that target the presence and notification service to presence and notification front door 114 and rely on front door 114 to route the messages to the appropriate one of server(s) 116 and server(s) 118.

Match server(s) 122 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 120 includes one or more server devices (and optionally a load balancing device(s)) and operates to abstract match server(s) 122 from security gateway 104 in a manner analogous to front door 114 abstracting server(s) 116 and server(s) 118.

Statistics server(s) 126 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 126 includes one or more server devices (and optionally a load balancing device(s)) and operates to abstract statistics server(s) 126 from security gateway 104 in a manner analogous to front door 114 abstracting server(s) 116 and server(s) 118.

Thus, it can be seen that security gateway 104 operates to shield devices in the secure zone of data center 110 from the untrusted, public network 106. Communications within the secure zone of data center 110 need not be encrypted, as all devices within data center 110 are trusted. However, any information to be communicated from a device within data center 110 to a game console 102 passes through security gateway cluster 104, where it is encrypted in such a manner that it can be decrypted by only the game console 102 targeted by the information.

Figure 2:
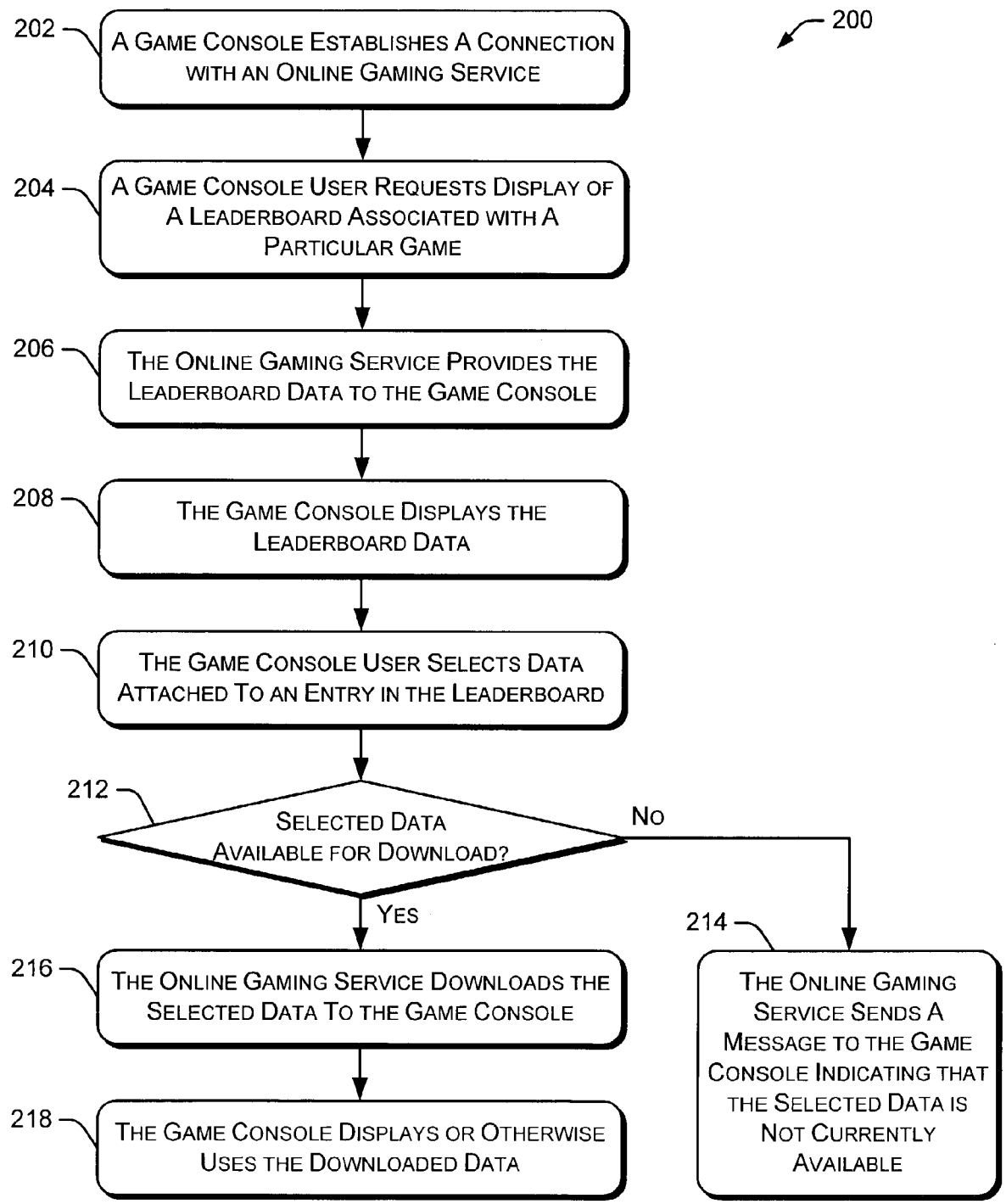
FIG. 2 is a flow diagram illustrating an embodiment of a procedure for retrieving data attached to a leaderboard entry.

FIG. 2 is a flow diagram illustrating an embodiment of a procedure 200 for retrieving data attached to a leaderboard entry. Initially, a game console establishes a connection with an online gaming service (block 202). A game console user requests display of a leaderboard associated with a particular game (block 204). The online gaming service then provides the requested leaderboard data to the game console (block 206). The game console generates a display of the received leaderboard data for the benefit of the game console user (block 208).

The game console user selects data attached to an entry in the leaderboard (block 210). The selected data may include a recorded game, game highlights, special plays or maneuvers, etc. A recorded game may also be referred to as a "ghost game", a "highlight game", a "replay", or a "saved game". The procedure determines whether the selected data is available for download (block 212). If the selected data is not available for download, the online gaming service sends a message to the game console indicating that the selected data is not currently available (block 214). Data may not be available for download due to server maintenance, server malfunction, or the data has not yet been fully uploaded to the online gaming service.

If the selected data is available for download at block 212, the online gaming service downloads the selected data to the game console (block 216). The game console then displays or otherwise uses the downloaded data (block 218). As discussed below, a game console user can compete against recorded game data and learn the techniques used by the player that uploaded the recorded game data. Other types of data allow the game console user to view game highlights, other players' best shots, or listen to an audio file of another player's voice explaining how their high score was obtained.

Recorded games may be associated with top-performing players or one or more friends that share recorded games and use the recorded games to conduct "virtual races" against one another. A group of friends or a club may have their own "leaderboard" where members can upload recorded games for other members to download. This leaderboard allows players to upload at least one recorded game regardless of whether the rating of the recorded game qualifies as a top score on a system-wide leaderboard. A particular online gaming system may have a multiple leaderboards for the same game program. Certain leaderboards may be accessible by all participants in the online gaming system while other leaderboards are accessible by a smaller group of players (such as a club or a group of friends).

FIG. 3 illustrates an example of a leaderboard 300 provided to a game console user. In this example, leaderboard 300 is associated with an auto racing game and maintains a listing of the ten best lap times. In other embodiments, other types of games may capture different types of information. Also, a leaderboard may include multiple types of game-related information, such as a fastest lap, a fastest three-lap race, fewest collisions, etc.

A first column 302 in leaderboard 300 identifies a particular ranking (e.g., 1–10). A second column 304 identifies a player name associated with each ranking in column 302. The player name may be a real name (e.g., Bob Smith) or a nickname (e.g., Master Gamer). A third column 306 identifies the player's best lap time that is at least partially responsible for the player's ranking. A fourth column 308 identifies any attachments that are associated with the ranking. In the example of FIG. 3, several recorded races and special moves are associated with certain rankings. For example, the highest rated player has a recorded race attached to (or associated with) their ranking. In this example, the recorded race is the race that resulted in the lap time shown in column 306. A special moves attachment represents, for example, a stunt performed during a race, a jump over one or more other vehicles, or other action that the player has associated with their ranking. As mentioned above, other players can download these attachments to learn from and/or compete against the player that generated the attachments.

A fifth column 310 in leaderboard 300 identifies whether the attached data in column 308 is available for downloading and/or viewing. If the attached data is available on, for example, a storage server in the online gaming service, the fifth column 310 will indicate the availability of the attached data as "Yes". However, if the attached data has been deleted, was never uploaded to the storage server, or is in the process of being uploaded to the storage server, column 310 will indicate the availability of the data as "No".

Although leaderboard 300 illustrates the top ten players for a particular game, other leaderboards may illustrate any number of players, such as the top five, the top twenty, or the top 100. Particular embodiments of leaderboard 300 may identify every nth rating, such as every 100th rating (i.e., the players rated 100th, 200th, 300th, etc.). This approach allows a player to select a saved game associated with another player having a similar skill level.

Each row (i.e., rating) in leaderboard 300 may have multiple data attachments. For example, a particular rating in leaderboard 300 may have an attached recorded game and an attached audio file of a player's voice describing how they achieved their high score.

FIG. 4 illustrates an example of recorded game data 400 associated with a car racing game. A top portion 402 of the recorded game data 400 includes various game settings that were in effect when the game data was recorded. These game settings include, for example, the difficulty setting of the game, the type of vehicle, the vehicle color and suspension characteristics, the course on which the vehicle was raced and the route taken (in the situation where there are multiple available routes).

Below top portion 402, recorded game data 400 includes two columns of data: a time column 404 and a controller input column 406. Each entry in time column 404 corresponds to the adjacent entry in controller input column 406. For example, the program starts at time 0.00.00 with no controller input. At time 0.00.09, the right trigger is activated. The right trigger remains activated until time 0.01.34, when the right side of the left thumbstick is pressed. The time format "a.bb.cc" represents "a" minutes, "bb" seconds, and "cc" hundredths of seconds.

In an alternate embodiment, controller input is recorded in frames. For example, if a game runs at 60 frames per second (fps) the controller input is recorded at the same rate.

By executing the game program and applying the various controller inputs at the appropriate times, the movement of the vehicle is the same as during the "original" race from which this data was collected.

Figure 5:
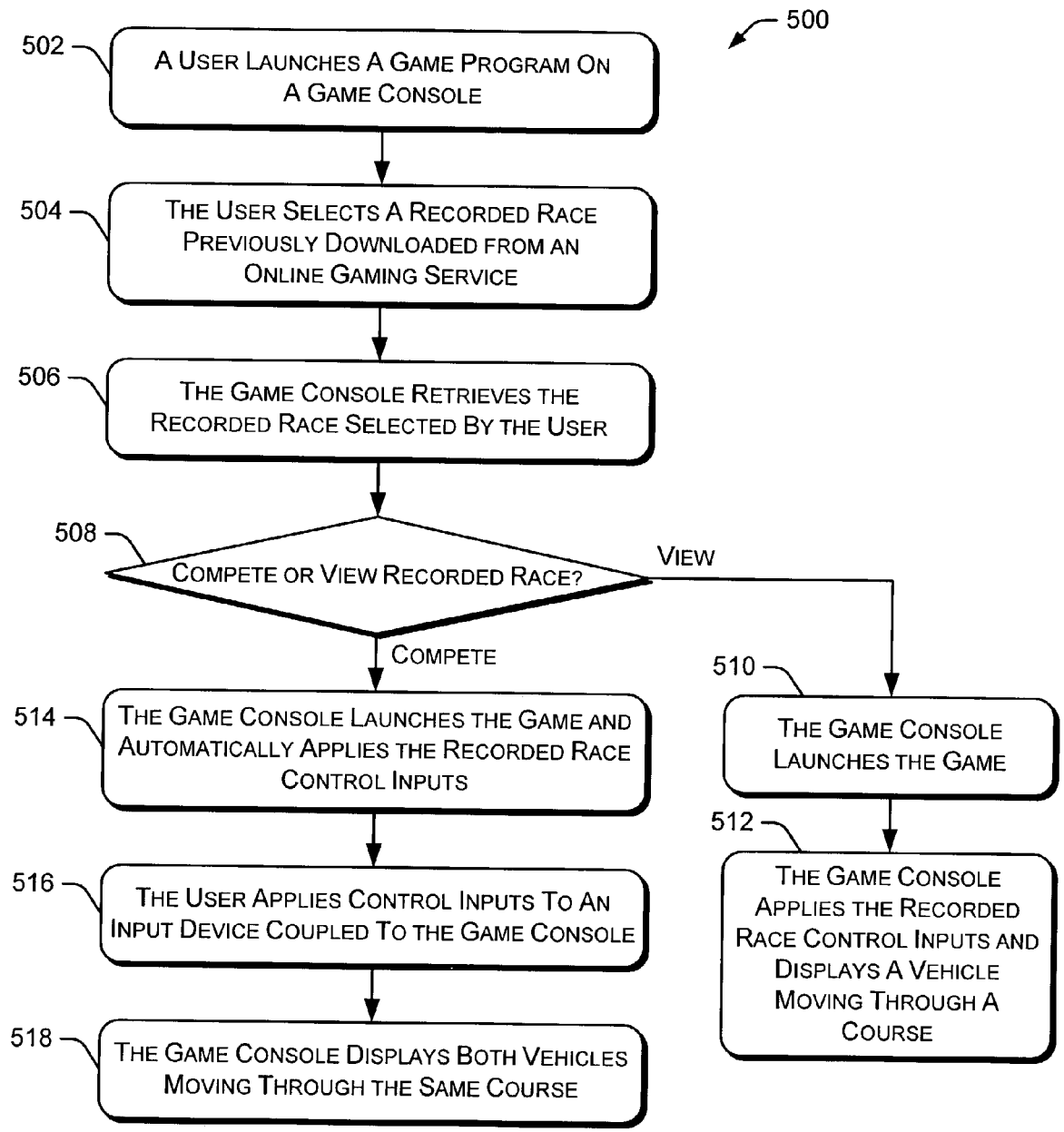
FIG. 5 is a flow diagram illustrating an embodiment of a procedure that allows a game console user to compete against recorded game data or to view a replay of recorded game data.

FIG. 5 is a flow diagram illustrating an embodiment of a procedure 500 that allows a game console user to compete against recorded game data or to view a replay of recorded game data. In the example of FIG. 5, the recorded game data is a recorded race from an auto racing game. Procedures similar to procedure 500 can be used with various other types of games.

Initially, a user launches a game program on a game console (block 502). The user then selects a recorded game (e.g., a recorded race) previously downloaded from an online gaming service (block 504). The game console retrieves the recorded race selected by the user from the online gaming service (block 506). The procedure then asks the user to select between competing with the recorded race or viewing the recorded race (block 508). If the user chooses to view the recorded race, the procedure branches to block 510 where the game console launches the game. The user can view the replay of the recorded race from different angles (e.g., from within the car and from outside the car). The chosen angle can be selected with an input device (such as a game controller) coupled to the game console. A particular view of the replay of the recorded race is from the driver's perspective. When launching the game, the game console configures the game using the game settings contained in the recorded race. The game console then applies the recorded race control inputs and displays a vehicle moving through a course in response to those control inputs (block 512).

If the user chooses to compete with the recorded race at block 508, the game console launches the game and automatically applies the recorded game control inputs (block 514). As mentioned above, when launching the game, the game console configures the game using the game settings contained in the recorded race. The game console user applies inputs to an input device coupled to the game console (block 516). The game console displays both vehicles (i.e., the vehicle following the recorded race data and the vehicle being controlled by the game console user) moving through the same course simultaneously (block 518).

In a particular embodiment, two or more players can compete against a recorded game at the same time. Further, two or more players can compete against two or more different recorded games simultaneously.

Figure 6:
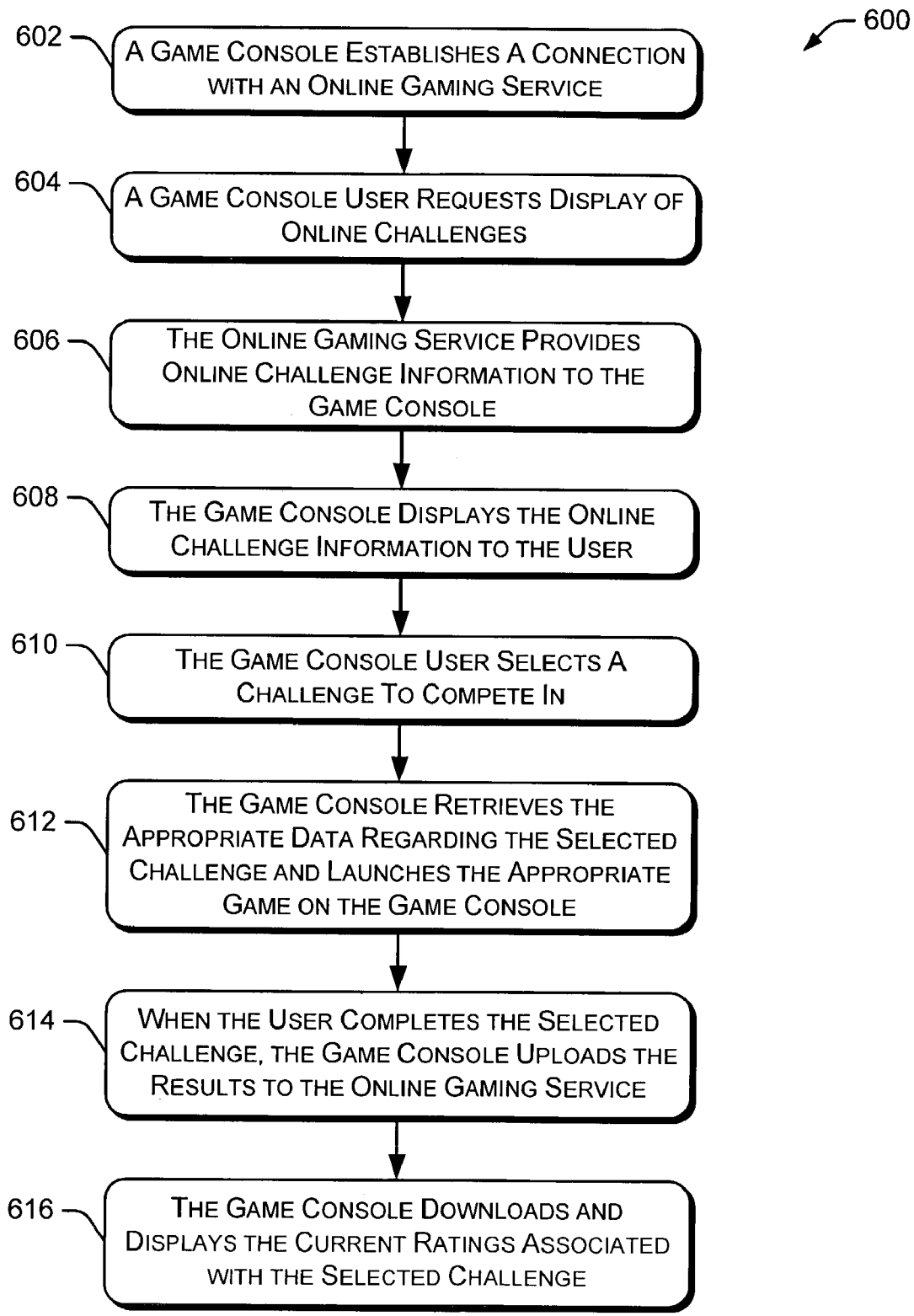
FIG. 6 is a flow diagram illustrating an embodiment of a procedure that allows a game console user to select and compete in an online game challenge.

FIG. 6 is a flow diagram illustrating an embodiment of a procedure 600 that allows a game console user to select and compete in an online game challenge. Initially, a game console establishes a connection with an online gaming service (block 602). A game console user requests display of available online challenges (block 604). Online challenges are competitions among online gamers that last for a particular time period, such as a day, a week, or a month. For example, in the case of a racing game, the online challenge specifies the type of car, the course, the configuration of the car, and any other necessary parameters such that all participants in the online challenge are competing in equal settings. Certain online challenges may be persistent and represent the all-time high scores.

In response to the game console request, the online gaming service provides online challenge information to the game console (block 606). At a particular time, there may be any number of online challenges available to the user of the game console. The game console displays the received online challenge information to the user of the game console (block 608). The game console user then selects a challenge in which they want to compete (block 610). The game console retrieves the appropriate data regarding the selected challenge and launches the appropriate game on the game console (block 612). The received data regarding the selected challenge includes configuration information used to configure the appropriate game. This configuration information ensures that all players play a game that is configured in the same manner. This configuration information may be similar to the game settings 402 shown in FIG. 4. Additionally, the configuration information may include city and track selection, car class (or a specific car selection), cone layout (if it's a cone race challenge), rewards and bonus points earned for completing the challenge (or portions of the challenge).

When the game console user completes the selected challenge, the game console uploads the results to the online gaming service (block 614). The game console then downloads and displays the current ratings associated with the selected challenge (block 616). The current ratings may include the user's results if they qualify as one of the top ratings. The current ratings associated with the selected challenge may be displayed in a format similar to the leaderboard 300 discussed above with respect to FIG. 3.

Particular examples discussed herein relate to recorded game data (also referred to as saved game data). In alternate embodiments, any type of data can be made available to various players. This data includes portions of a recorded game, a longest run in a football game, a biggest explosion, a clever golf shot, best bloopers (i.e., mistakes), and the like. Additionally, games can record a "highlight" film of particularly interesting items and make them available on leader boards or some other mechanism. Sports games could encourage players to play frequently by providing a highlight show where players can watch the best plays such as a longest interception, a longest home run, best basketball dunk, etc. Similarly, action games can record films for interesting events, such as largest explosions, most crashes in a given time period, etc.

Figure 7:
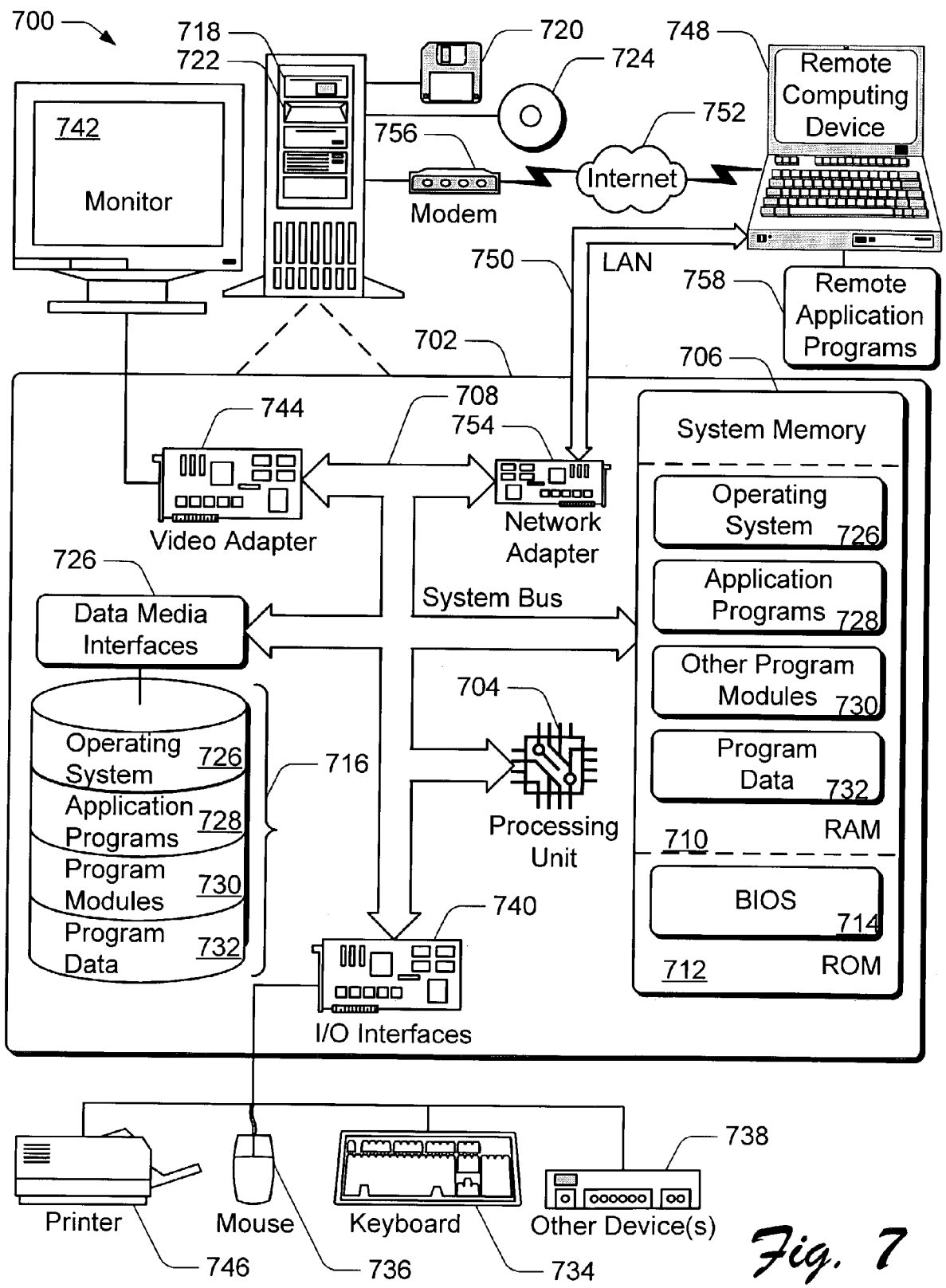
FIG. 7 illustrates a general computer environment, which can be used to implement the techniques described herein.

FIG. 7 illustrates a general computer environment 700, which can be used to implement the techniques described herein. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the exemplary computer environment 700.

Computer environment 700 includes a general-purpose computing device in the form of a computer 702. Computer 702 can be, for example, a statistics front door 124, a monitoring server 112, a key distribution center 128, or a security I gateway 104 of FIG. 1. The components of computer 702 can include, but are not limited to, one or more processors or processing units 704 (optionally including a cryptographic processor or co-processor), a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, game console, and the like. The remote computing device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Figure 8:
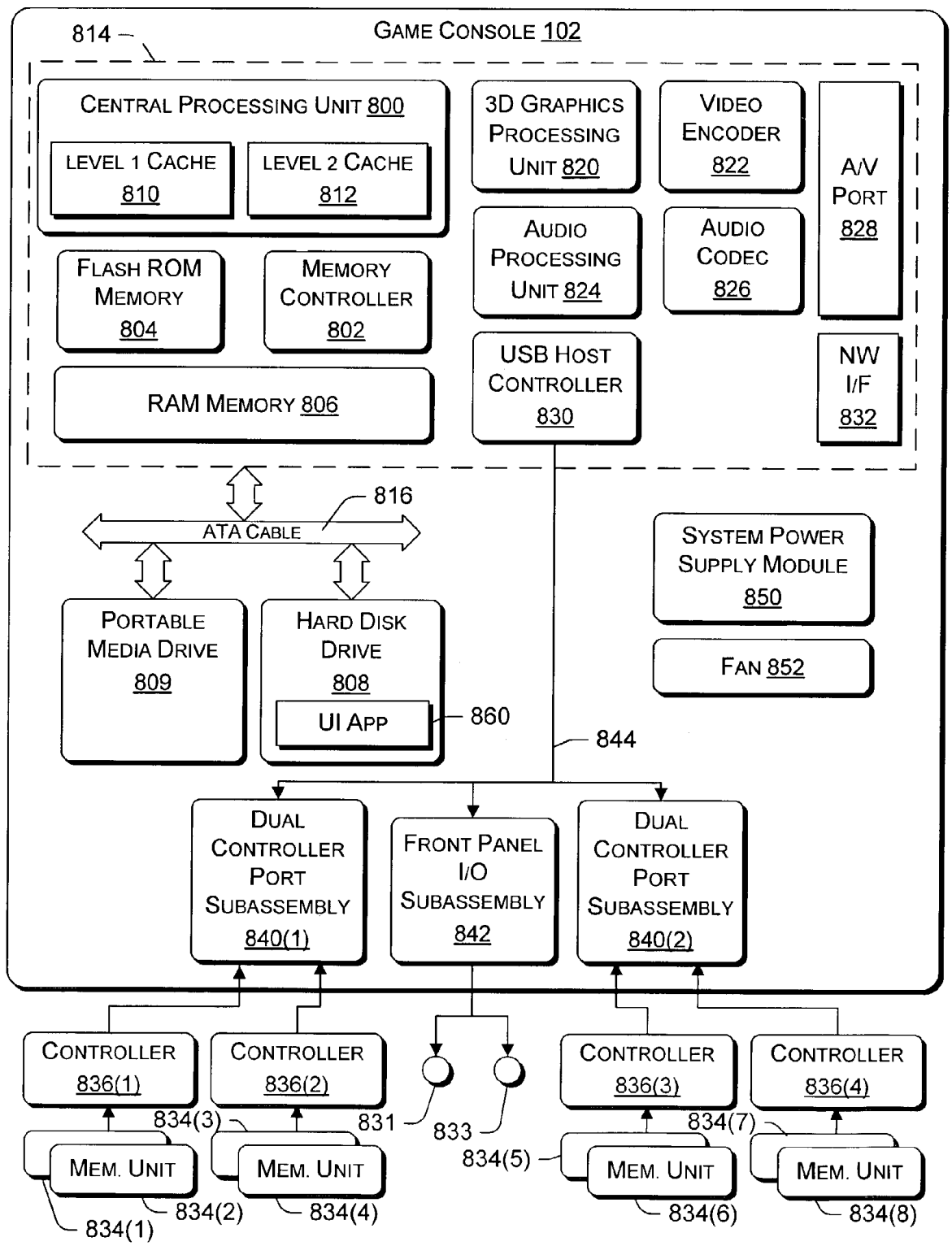
FIG. 8 shows functional components of a game console in more detail.

FIG. 8 shows functional components of a game console 102 in more detail. Game console 102 has a central processing unit (CPU) 800 and a memory controller 802 that facilitates processor access to various types of memory, including a flash ROM (Read Only Memory) 804, a RAM (Random Access Memory) 806, a hard disk drive 808, and a portable media drive 809. CPU 800 is equipped with a level 1 cache 810 and a level 2 cache 812 to temporarily store data and hence reduce the number of memory access cycles, thereby improving processing speed and throughput.

CPU 800, memory controller 802, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, CPU 800, memory controller 802, ROM 804, and RAM 806 are integrated onto a common module 814. In this implementation, ROM 804 is configured as a flash ROM that is connected to the memory controller 802 via a PCI (Peripheral Component Interconnect) bus and a ROM bus (neither of which are shown). RAM 806 is configured as multiple DDR SDRAM (Double Data Rate Synchronous Dynamic RAM) that are independently controlled by the memory controller 802 via separate buses (not shown). The hard disk drive 808 and portable media drive 809 are connected to the memory controller via the PCI bus and an ATA (AT Attachment) bus 816.

A 3D graphics processing unit 820 and a video encoder 822 form a video processing pipeline for high speed and high resolution graphics processing. Data is carried from the graphics processing unit 820 to the video encoder 822 via a digital video bus (not shown). An audio processing unit 824 and an audio codec (coder/decoder) 826 form a corresponding audio processing pipeline with high fidelity and stereo processing. Audio data is carried between the audio processing unit 824 and the audio codec 826 via a communication link (not shown). The video and audio processing pipelines output data to an A/V (audio/video) port 828 for transmission to the television or other display. In the illustrated implementation, the video and audio processing components 820–828 are mounted on the module 814.

Also implemented on the module 814 are a USB host controller 830 and a network interface 832. The USB host controller 830 is coupled to the CPU 800 and the memory controller 802 via a bus (e.g., PCI bus) and serves as host for the peripheral controllers 836(1)–836(4). The network interface 832 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 840(1) and 840(2), with each subassembly supporting two game controllers 836(1)–836(4). A front panel I/O subassembly 842 supports the functionality of a power button 831 and a media drive eject button 833, as well as any LEDs (light emitting diodes) or other indicators exposed on the outer surface of the game console. The subassemblies 840(1), 840(2), and 842 are coupled to the module 814 via one or more cable assemblies 844.

Eight memory units 834(1)–834(8) are illustrated as being connectable to the four controllers 836(1)–836(4), i.e., two memory units for each controller. Each memory unit 834 offers additional storage on which games, game parameters, and other data may be stored. When inserted into a controller, the memory unit 834 can be accessed by the memory controller 802.

A system power supply module 850 provides power to the components of the game console 102. A fan 852 cools the circuitry within the game console 102.

A console user interface (UI) application 860 is stored on the hard disk drive 808. When the game console is powered on, various portions of the console application 860 are loaded into RAM 806 and/or caches 810, 812 and executed on the CPU 800. Console application 860 presents a graphical user interface that provides a consistent user experience when navigating to different media types available on the game console.

Game console 102 implements a cryptography engine to perform common cryptographic functions, such as encryption, decryption, authentication, digital signing, hashing, and the like. The cryptography engine may be implemented as part of the CPU 800, or in software stored on the hard disk drive 808 that executes on the CPU, so that the CPU is configured to perform the cryptographic functions. Alternatively, a cryptographic processor or co-processor designed to perform the cryptographic functions may be included in game console 102.

Game console 102 may be operated as a standalone system by simply connecting the system to a television or other display. In this standalone mode, game console 102 allows one or more players to play games, watch movies, or listen to music. However, with the integration of broadband connectivity made available through the network interface 832, game console 102 may further be operated as a participant in online gaming, as discussed above.

It should be noted that although the game console discussed herein is described as a dedicated game console (not a general-purpose PC running computer games), the game console may also incorporate additional functionality. For example, the game console may include digital video recording functionality SO that it can operate as a digital VCR, the game console may include channel tuning functionality so that it can tune and decode television signals (whether they be broadcast signals, cable signals, satellite signals, etc.), and so forth. Further, in alternate embodiments, the game console is replaced with a set top box or other computing device.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:
1. A method comprising:
  displaying a leaderboard associated with a race, wherein the leaderboard includes multiple entries each of which being associated with individual players, wherein at least one entry includes attached data that contains a recorded race associated with an individual player and at least one other entry contains an excerpt from a race that an individual player played, wherein at least one excerpt comprises less than an entire portion of a race that an associated player played to completion;
  downloading, responsive to a leaderboard selection, a recorded race from an online gaming service, wherein the recorded race is associated with a game program, and wherein a user can select from among multiple recorded races;
  launching the game program on a game console;
  applying the recorded race to the game program executing on the game console, wherein the recorded race controls a first vehicle moving through a course; and
  receiving control inputs from an input device coupled to the game console, wherein the control inputs control a second vehicle moving through the course.

2. A method as recited in claim 1 further comprising identifying a plurality of recorded races available from an online gaming service prior to downloading a recorded race.

3. A method as recited in claim 1 wherein the game program is an auto racing game.

4. A method as recited in claim 1 wherein the recorded race is a portion of an entire race.

5. A method as recited in claim 1 wherein the recorded race is associated with a rating on the leaderboard.

6. A method as recited in claim 1 further comprising displaying the first vehicle and the second vehicle simultaneously.

7. A method as recited in claim 1 wherein launching the game program includes configuring the game program based on settings in the recorded race.

8. A method comprising:
 displaying a leaderboard associated with a race, wherein the leaderboard includes multiple entries each of which being associated with individual players, wherein at least one entry includes attached data that contains a recorded race associated with an individual player and at least one other entry contains an excerpt from a race that an individual player played, wherein at least one excerpt comprises less than an entire portion of a race that an associated player played to completion;
 downloading, responsive to a leaderboard selection, a recorded race from an online gaming service, wherein the recorded race is associated with a game program, and wherein a user can select from among multiple recorded races;
 launching the game program on a game console;
 applying the recorded race to the game program executing on the game console, wherein the recorded race controls a vehicle moving through a course; and
 receiving control inputs from an input device coupled to the game console, wherein the control inputs control an angle from which the vehicle is displayed.

9. A method as recited in claim 8 wherein the angle from which the vehicle is displayed is from within the vehicle.

10. A method as recited in claim 8 wherein the angle from which the vehicle is displayed is from outside the vehicle.

11. A method as recited in claim 8 wherein the recorded race is associated with a rating on the leaderboard.

12. A method as recited in claim 8 wherein launching the game program includes configuring the game program based on settings stored in the recorded race.

13. A method comprising:
 identifying a plurality of recorded games available from an online gaming service, wherein at least one recorded game contains less than an entire duration of a game that an associated player played to completion;
 downloading one of the plurality of recorded games from the online gaming service, wherein the downloaded recorded game is associated with a game program;
 launching the game program on a game console;
 configuring the game program based on settings in the recorded game;
 applying the recorded game to the game program, wherein the game program receives control inputs from the recorded game; and
 displaying the results of applying the recorded game to the game program.

14. A method as recited in claim 13 further comprising receiving control inputs from an input device coupled to the game console.

15. A method as recited in claim 13 further comprising receiving control inputs from an input device coupled to the game console, wherein the control inputs control a particular object in the game.

16. A method as recited in claim 13 further comprising receiving control inputs from an input device coupled to the game console, wherein the control inputs control a character in the game.

17. A method as recited in claim 13 further comprising receiving control inputs from an input device coupled to the game console, wherein the control inputs control a display angle at which game actions are displayed.

18. A method comprising:
 receiving leaderboard data in a game console, wherein the leaderboard data includes saved game data associated with a plurality of leaderboard entries, and wherein leaderboard data is received from an online gaming service, wherein game data associated with at least one of the entries contains excerpts from a game, wherein the excerpt comprises less than an entire game that a player played to completion;
 displaying the leaderboard data to a user of the game console;
 selecting a particular saved game from the leaderboard data;
 downloading the particular saved game from the online gaming service, wherein the particular saved game is associated with a game program;
 launching the game program on the game console; and
 applying the particular saved game to the game program executing on the game console, wherein the game program receives inputs from the particular saved game.

19. A method as recited in claim 18 wherein the inputs from the particular saved game are control inputs.

20. A method as recited in claim 18 wherein launching the game program on the game console includes configuring the game program using settings in the particular saved game.

21. An apparatus comprising:
 an interface configured to communicate with an online game service via a public network; and
 a processor coupled to the interface, the processor configured to download a recorded race from the online gaming service and to launch a game program associated with the recorded race, the processor further configured to apply the recorded race to the executing game program, wherein the recorded race controls a first vehicle moving through a course and an input device coupled to the processor controls a second vehicle moving through the course, and wherein the recorded race is associated with a rating on a leaderboard maintained by the online gaming service that can be displayed to a user, wherein the leaderboard contains multiple entries each of which being associated with a player, wherein at least one of the entries contains a recording that comprises less than an entirety of a race that a player played to completion.

22. An apparatus as recited in claim 21 further comprising displaying the first vehicle and the second vehicle simultaneously.

23. One or more computer-readable media having stored thereon a computer program that, when executed by one or more processors, causes the one or more processors to:
 identify a plurality of recorded games available from an online gaming service wherein at least one recorded game contains less than an entire game that a player played to completion;

download one of the plurality of recorded games from the online gaming service, wherein the downloaded recorded game is associated with a game program;

launch the game program on a game console;

configure the game program based on settings in the recorded game;

apply the recorded game to the game program, wherein the game program receives inputs from the recorded game; and display the results of applying the recorded game to the game program.

24. One or more computer-readable media as recited in claim 23 wherein the game program is a car racing game.

25. One or more computer-readable media as recited in claim 23 further comprising receiving control inputs from an input device coupled to the game console.

* * * * *